US012793663B2

(12) United States Patent
Hou

(10) Patent No.: US 12,793,663 B2

(45) Date of Patent: Nov. 10, 2026

(54) BACKLIGHT ADJUSTMENT METHOD AND DEVICE, SYSTEM, STORAGE MEDIUM AND PRODUCT

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Feng Hou, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/994,677

(22) PCT Filed: May 10, 2023

(86) PCT No.: PCT/CN2023/093319

§ 371 (c)(1),
(2) Date: Jan. 15, 2025

(87) PCT Pub. No.: WO2024/229764

PCT Pub. Date: Nov. 14, 2024

(65) Prior Publication Data

US 2026/0018141 A1 Jan. 15, 2026

(51) Int. Cl.

*G09G 3/34* (2006.01)
*G09G 3/36* (2006.01)

(52) U.S. Cl.

CPC ......... *G09G 3/3426* (2013.01); *G09G 3/3607* (2013.01); *G09G 2320/0233* (2013.01); *G09G 2320/0247* (2013.01); *G09G 2320/0257* (2013.01); *G09G 2320/0686* (2013.01); *G09G 2360/16* (2013.01)

(58) Field of Classification Search

None

See application file for complete search history.

(56) References Cited

U.S. PATENT DOCUMENTS

| | | | | |
|---|---|---|---|---|
| 10,515,595 | B2 | 12/2019 | Seong et al. | |
| 2021/0304689 | A1* | 9/2021 | Nam .................... | G09G 3/3426 |
| 2023/0094077 | A1 | 3/2023 | Zhao et al. | |

FOREIGN PATENT DOCUMENTS

| | | | |
|---|---|---|---|
| CN | 101282425 | A | 10/2008 |
| CN | 101763830 | A | 6/2010 |
| CN | 102930831 | A | 2/2013 |
| CN | 103325112 | A | 9/2013 |
| CN | 103514853 | A | 1/2014 |
| CN | 107689214 | A | 2/2018 |

(Continued)

*Primary Examiner* — Christopher J Kohlman

(74) *Attorney, Agent, or Firm* — Chiwin Law LLC

(57) ABSTRACT

A backlight adjustment method and device for a display device, a system, a storage medium and a product. The backlight adjusting method includes: inputting a plurality of frames of images to a display device; acquiring a plurality of backlight matrices corresponding to the plurality of frames of images, wherein the backlight matrix includes a plurality of backlight values; acquiring a connected domain consisting of the backlight value which is a positive number according to the backlight matrix; and determining an adjustment scheme of the backlight value at a boundary position of the connected domain according to the connected domain.

20 Claims, 7 Drawing Sheets

(56) References Cited

FOREIGN PATENT DOCUMENTS

| | | | |
|---|---|---|---|
| CN | 110910840 | A | 3/2020 |
| CN | 111599320 | A | 8/2020 |
| CN | 113299245 | A | 8/2021 |
| CN | 114019688 | A | 2/2022 |
| CN | 114974143 | A | 8/2022 |
| CN | 115223509 | A | 10/2022 |
| KR | 20180074563 | A | 7/2018 |

* cited by examiner (a)

(b)

BACKLIGHT ADJUSTMENT METHOD AND DEVICE, SYSTEM, STORAGE MEDIUM AND PRODUCT

CROSS-REFERENCE TO RELATED APPLICATION

The present application is a U.S. National Phase Entry of International Application No. PCT/CN2023/093319, filed on May 10, 2023, the entirety of which is incorporated into this application by reference.

TECHNICAL FIELD

Embodiments of the present disclosure relate to a backlight adjustment method for a display device, a backlight adjustment device for a display device, a computer system, a computer-readable storage medium and a computer program product.

BACKGROUND

Liquid Crystal Display (LCD) has the advantages of ultra-long service time, low power consumption, low operating voltage, high color rendering index, fast response, environmental protection, small size and low radiation, and has been widely used in electronic devices such as notebook computers, mobile phones and LC (Liquid Crystal) TVs. The LCD device is a passive light-emitting device, which mainly includes an LCD panel and a backlight source. The LCD panel itself does not emit light, but relies on the backlight source which provides a light source for the LCD panel. In order to reduce the power consumption of LCD devices and increase the display contrast, LCD devices with regional backlight brightness adjustment are gradually developed.

SUMMARY

When it's expected to solve the problem of excessively large halation by reducing the halation corresponding to the object backlight in the display screen, if the same backlight processing procedure is adopted for objects with different areas and sizes, the halation as formed will be different in visual experience. The embodiment of the present disclosure provides a backlight adjustment method for a display device, which allows suitable backlight adjustment schemes to be selected for various objects on a display screen, thereby alleviating the problem of backlight halation more effectively.

At least one embodiment of the present disclosure provides a backlight adjustment method for a display device, including: inputting a plurality of frames of images to the display device; acquiring a plurality of backlight matrices corresponding to the plurality of frames of images, wherein the backlight matrix includes a plurality of backlight values; acquiring a connected domain consisting of the backlight value which is a positive number, according to the backlight matrix; and determining an adjustment scheme of the backlight value at a boundary position of the connected domain according to the connected domain.

For example, in the backlight adjustment method provided by an embodiment of the present disclosure, the determining the adjustment scheme of the backlight value at the boundary position of the connected domain according to the connected domain, includes: acquiring a first parameter according to the connected domain; setting a first parameter threshold, and comparing the first parameter with the first parameter threshold; if the first parameter is smaller than or equal to the first parameter threshold, adjusting the backlight value at the boundary position of the connected domain by adopting a first adjustment scheme; if the first parameter is greater than the first parameter threshold, adjusting the backlight value at the boundary position of the connected domain by adopting the first adjustment scheme or a second adjustment scheme, wherein the first adjustment scheme and the second adjustment scheme are different.

For example, in the backlight adjustment method provided by an embodiment of the present disclosure, the first parameter includes: a ratio of a perimeter of the connected domain to a perimeter of a backlight region; or a ratio of an area of the connected domain to an area of the backlight region.

For example, in the backlight adjustment method provided by an embodiment of the present disclosure, after determining that the first parameter is greater than the first parameter threshold, the determining the adjustment scheme of the backlight value at the boundary position of the connected domain according to the connected domain further includes: acquiring a second parameter according to the connected domain; setting a second parameter threshold, and comparing the second parameter with the second parameter threshold; if the second parameter is smaller than or equal to the second parameter threshold, adjusting the backlight value at the boundary position of the connected domain by adopting the second adjustment scheme; if the second parameter is greater than the second parameter threshold, determining whether to adopt the first adjustment scheme according to a third parameter.

For example, in the backlight adjustment method provided by an embodiment of the present disclosure, the second parameter includes a ratio of a maximum boundary distance of the connected domain to a minimum boundary distance of the connected domain.

For example, in the backlight adjustment method provided by an embodiment of the present disclosure, after determining that the second parameter is greater than the second parameter threshold, the determining the adjustment scheme of the backlight value at the boundary position of the connected domain according to the connected domain further includes: acquiring the third parameter according to the connected domain; setting a third parameter threshold, and comparing the third parameter with the third parameter threshold; if the third parameter is smaller than or equal to the third parameter threshold, adjusting the backlight value at the boundary position of the connected domain by adopting the first adjustment scheme; if the third parameter is greater than the third parameter threshold, adjusting the backlight value at the boundary position of the connected domain by adopting the second adjustment scheme.

For example, in the backlight adjustment method provided by an embodiment of the present disclosure, the third parameter includes a ratio of a minimum boundary distance of the connected domain to a minimum boundary distance of the backlight region.

For example, in the backlight adjustment method provided by an embodiment of the present disclosure, the first adjustment scheme includes: multiplying the backlight value at the boundary position of the connected domain by a weighting coefficient; the second adjustment scheme includes: filtering the backlight value at the boundary position of the connected domain.

For example, in the backlight adjustment method provided by an embodiment of the present disclosure, before filtering the backlight value at the boundary position of the connected domain, the second adjustment scheme further includes: judging a number and a position of an adjacent position, where the backlight value is zero, of the boundary position of the connected domain; and selecting a filtering operator according to the judging result.

For example, in the backlight adjustment method provided by an embodiment of the present disclosure, the backlight matrix includes a row direction and a column direction, and the number of adjacent positions of the boundary position of the connected domain is four, and the four adjacent positions include: a first adjacent position and a second adjacent position which are opposite to each other in the row direction, and a third adjacent position and a fourth adjacent position which are opposite to each other in the column direction, with the boundary position as a center; the selecting the filtering operator according to the judging result includes: if the backlight value at one of the first adjacent position and the second adjacent position is zero and the backlight value at one of the third adjacent position and the fourth adjacent position is zero, selecting an N*N type filtering operator or a "cross" type filtering operator; if the backlight value at one of the first adjacent position and the second adjacent position is zero, selecting a 1*N type filtering operator; and if the backlight value at one of the third adjacent position and the fourth adjacent position is zero, selecting an N*1 filtering operator, where N is an odd number greater than or equal to 3.

For example, in the backlight adjustment method provided by an embodiment of the present disclosure, the acquiring a plurality of backlight matrices corresponding to the plurality of frames of images includes: acquiring backlight matrices corresponding to any two adjacent frames of images, wherein the backlight adjustment method further includes: acquiring a backlight difference matrix according to the backlight matrices of the any two adjacent frames of images; determining a backlight change position according to the backlight difference matrix; and judging a backlight change trend of the backlight change position according to the backlight difference matrix.

For example, in the backlight adjustment method provided by an embodiment of the present disclosure, a difference value in the backlight difference matrix includes zero, a positive number or a negative number, wherein the determining the backlight change position according to the backlight difference matrix includes: if the difference value in the backlight difference matrix is a positive number or a negative number, it is determined that a position where the difference value is located is the backlight change position.

For example, in the backlight adjustment method provided by an embodiment of the present disclosure, the judging the backlight change trend of the backlight change position according to the backlight difference matrix includes: determining the backlight change position where the difference value is a positive number according to the backlight difference matrix; judging whether the difference value, at an adjacent position of the backlight change position where the difference value is the positive number, is zero; and judging the backlight change trend of the backlight change position according to a judging result.

For example, in the backlight adjustment method provided by an embodiment of the present disclosure, the adjacent position of the backlight change position includes a first position, a second position, a third position and a fourth position which are arranged clockwise around the backlight change position as a center, wherein the judging the backlight change trend of the backlight change position according to the judging result includes: if the difference value at only one of the first position, the second position, the third position and the fourth position is zero, the backlight change trend of the backlight change position is towards the position where the difference value is zero; if the difference values at any two adjacent positions of the first position, the second position, the third position and the fourth position are zero, the backlight change trend of the backlight change position is towards a gap between the two adjacent positions; and if the difference values at any three of the first position, the second position, the third position and the fourth position are zero, the backlight change trend of the backlight change position is towards a direction away from one position where the difference value is not zero among the first position, the second position, the third position and the fourth position.

For example, the backlight adjustment method provided by an embodiment of the present disclosure further includes: adjusting the backlight value at the adjacent position of the backlight change position according to the backlight change trend, wherein the difference value at the adjacent position of the backlight change position is zero.

For example, in the backlight adjustment method provided by an embodiment of the present disclosure, the adjusting the backlight value at the adjacent position of the backlight change position according to the backlight change trend includes: determining the backlight change position where the difference value is a positive number; determining a fifth position adjacent to the backlight change position where the difference value is the positive number and a sixth position adjacent to the fifth position along the backlight change trend; and adjusting the backlight value at the fifth position.

For example, in the backlight adjustment method provided by an embodiment of the present disclosure, the backlight value at the fifth position is calculated by nonlinear interpolation through a calculation formula of $$y_{i,j}^{t} = \alpha \times \frac{y_{i-1,j}^{t-1} + y_{i+1,j}^{t-1}}{2}; \text{ or } y_{i,j}^{t} = \alpha \times \frac{y_{i,j-1}^{t-1} + y_{i,j+1}^{t-1}}{2},$$

wherein the backlight matrix includes a row direction and a column direction, i and j respectively represent a row direction index and a column direction index of the backlight matrix, $y^t$ represents the backlight value at a moment t of the backlight matrix, and α represents a self-adaptive adjustment parameter which is calculated through a formula of $$\alpha = \frac{y_{i,j}^{t-1}}{255}.$$

For example, the backlight adjustment method provided by an embodiment of the present disclosure further includes: adjusting the backlight value at the backlight change position to zero according to the backlight change trend.

For example, in the backlight adjustment method provided by an embodiment of the present disclosure, the adjusting the backlight value at the backlight change position to zero according to the backlight change trend includes: if the difference value at the backlight change position is a negative number and the difference value at the adjacent position of the backlight change position is zero, adjusting the backlight value at the backlight change position to zero.

For example, the backlight adjustment method provided by an embodiment of the present disclosure further includes: acquiring the backlight matrix according to a display gray value of the image.

For example, in the backlight adjustment method provided by an embodiment of the present disclosure, the backlight region includes a plurality of backlight subregions in one-to-one correspondence with a plurality of backlight values of the backlight matrix; the image includes a plurality of image subregions in one-to-one correspondence with the plurality of backlight subregions; and the image subregion includes a plurality of pixel points; the acquiring the backlight matrix according to the display gray value of the image includes: acquiring a maximum display gray value and an average display gray value of each image subregion according to the display gray values of the plurality of pixel points of each image subregion; and weighting the maximum display gray value and the average gray value of each image subregion to obtain the backlight value of the backlight subregion corresponding to the image subregion.

At least one embodiment of the present disclosure provides a backlight adjustment device for a display device, including: an input module configured to input a plurality of frames of images to the display device; a first acquisition module configured to acquire a plurality of backlight matrices corresponding to the plurality of frames of images, wherein the backlight matrix includes a plurality of backlight values; a second acquisition module configured to acquire a connected domain consisting of the backlight value which is a positive number, according to the backlight matrix; a first determination module configured to determine an adjustment scheme of the backlight value at a boundary position of the connected domain according to the connected domain; and an output module configured to output the adjusted backlight matrix to a backlight display module.

At least one embodiment of the present disclosure provides a computer system, including a memory, a processor and a computer program stored on the memory, wherein the processor is configured to execute the computer program to realize steps of the backlight adjustment method described in any of the above.

At least one embodiment of the present disclosure provides a computer-readable storage medium having a computer program stored thereon, wherein the computer program, when executed by a processor, is configured to realize steps of the backlight adjustment method described in any of the above.

At least one embodiment of the present disclosure provides a computer program product, including a computer program, wherein the computer program, when executed by a processor, realizes the steps of the backlight adjustment method described in any of the above.

BRIEF DESCRIPTION OF DRAWINGS

In order to more clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
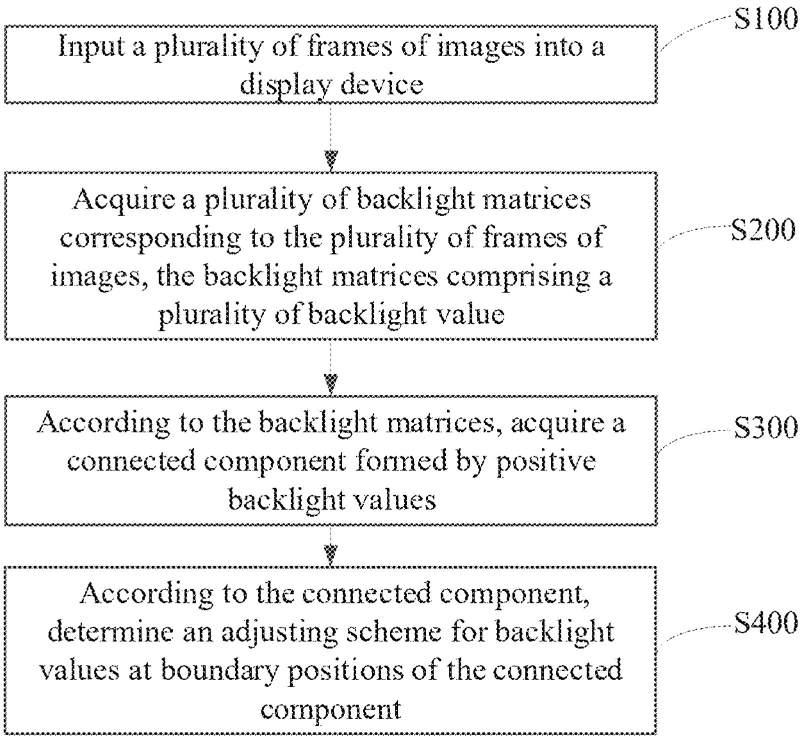
FIG. 1 is a flowchart of a backlight adjustment method provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Unless otherwise defined, the features such as "parallel", "vertical" and "identical" used in the embodiments of the disclosure all include cases such as "parallel", "vertical" and "identical" in a strict sense, and cases such as "substantially parallel", "substantially vertical" and "substantially identical" containing certain errors. For example, the above-mentioned "substantially" means that the difference of the compared objects is within 10% or 5% of the average value of the compared objects. When the number of a component or element is not specified in the following of the disclosed embodiments, it means that the component or element can be one or more, or can be understood as at least one. "At least one" means one or more, and "multiple/a plurality" means at least two.

When LCD panel uses a plane light source as a backlight source, the whole backlight becomes brighter or darker during the displaying procedure of the panel, so it is impossible to control the light accurately. In order to realize the independent control of backlight brightness, the backlight regional-adjustment technology can be adopted for the LCD panel, which divides the image signal into several regions, and performs analysis and calculation according to the image gray level of each region, and then automatically controls the brightness of the backlight source corresponding to the image of each region, thus realizing the independent control of the brightness of each region.

When it's expected to solve the problem of excessively large halation by reducing the halation corresponding to the object backlight in the display screen, if the same backlight processing procedure is adopted for objects with different areas and sizes, the halation as formed will be different in visual experience. For example, with the same backlight value, the halation as formed seems smaller for large-area objects and seems larger for small-area objects. Therefore, for objects with different areas and sizes, it cannot solve the problem of halation well by using the same backlight treatment.

In addition, backlight dimming technology is often realized by chip-level hardware, and the commonly used hardware includes Field Programmable Gate Array (FPGA) chip, which can realize backlight adjustment and pixel compensation at the same time. However, the research and development of hardware equipment involve expensive cost and long period, so it is impossible to realize system integration in a short time.

In this regard, embodiments of the present disclosure provide a backlight adjustment method for a display device, a backlight adjustment device for a display device, a computer system, a computer-readable storage medium and a computer program product. The backlight adjustment method includes: inputting a plurality of frames of images to the display device; acquiring a plurality of backlight matrices corresponding to the plurality of frames of images, wherein the backlight matrix includes a plurality of backlight values; acquiring a connected domain consisting of the backlight value which is a positive number, according to the backlight matrix; and determining an adjustment scheme of the backlight value at a boundary position of the connected domain according to the connected domain.

In the backlight adjustment method provided by the embodiment of the present disclosure, different connected domains can choose different adjustment schemes for the backlight value at the boundary position, so that suitable backlight adjustment schemes can be selected for various objects on the display screen, and hence the problem of backlight halation can be solved more effectively.

In addition, the problem of backlight halation can be solved by the backlight values without adding other chips, which can be realized by the scaler card of the display device, thus reducing the cost and shortening the development period.

Hereinafter, the backlight adjustment method, the computer system, the computer-readable storage medium and the computer program product provided by the embodiments of the present disclosure will be described in details with reference to the accompanying drawings.

An embodiment of the present disclosure provides a backlight adjustment method. FIG. 1 is a flowchart of a backlight adjustment method provided by an embodiment of the present disclosure. As shown in FIG. 1, the backlight adjustment method includes the following steps:

S100, inputting a plurality of frames of images to the display device;

S200, acquiring a plurality of backlight matrices corresponding to the plurality of frames of images, wherein the backlight matrix includes a plurality of backlight values;

S300, acquiring a connected domain consisting of the backlight value which is a positive number, according to the backlight matrix; and S400, determining an adjustment scheme of the backlight value at a boundary position of the connected domain according to the connected domain.

Figure 2:
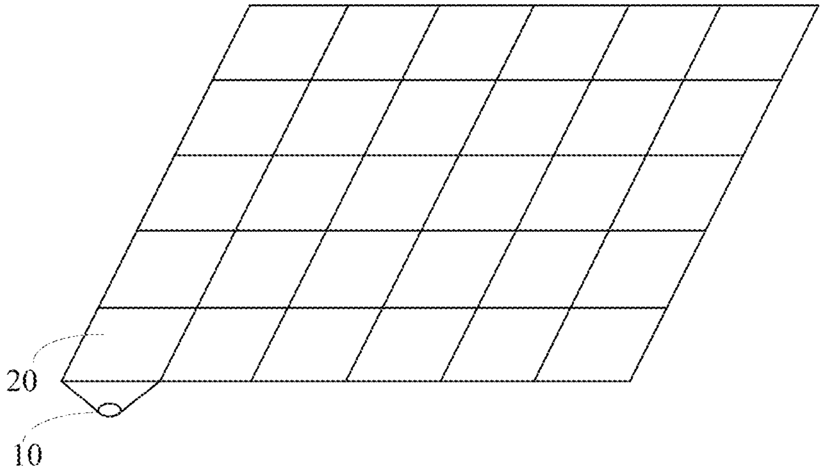
FIG. 2 is a schematic diagram illustrating a corresponding relationship between backlight subregions and image subregions provided by an embodiment of the present disclosure.

The plurality of backlight values of the backlight matrix can be calculated according to the display gray value of the input image. FIG. 2 is a schematic diagram of the corresponding relationship between backlight subregions and image subregions provided by an embodiment of the present disclosure. As shown in FIG. 2, a backlight module of the display device includes a plurality of backlight sources 10 arranged in an array. In order to clearly show the corresponding relationship between backlight subregions and image subregions, only one backlight source 10 is schematically shown in the figure. The plurality of backlight sources of the backlight module form a backlight region of the display device, and the backlight region of the display device includes a plurality of backlight subregions in one-to-one correspondence with the plurality of backlight sources. The image includes a plurality of image subregions 20 in one-to-one correspondence with the plurality of backlight sources, and each image subregion 20 includes a plurality of pixel points. According to the display gray values of the plurality of pixel points of each image subregion, the backlight value of the backlight subregion corresponding to the image subregion can be obtained, so that the corresponding backlight matrix can be obtained according to the input image. The embodiment of the present disclosure does not limit the calculation method of the backlight value.

For example, the color of each pixel point in an image subregion is composed of colors of three channels, which are red color (Red), green color (Green) and blue color (Blue), respectively. In order to calculate the backlight value, it is necessary to convert tricolor values of red color, green color and blue color into the display gray value of the pixel point firstly, and then the backlight value of the corresponding backlight subregion can be obtained according to the display gray values of the plurality of pixel points. For example, the conversion formula of display gray value can be as follows: $Gray=R*0.299+G*0.587+B*0.114$, wherein Gray is the display gray value, and R, G and B represent tricolor values of red color, green color and blue color respectively. Of course, the embodiment of the present disclosure does not specifically limit the conversion formula of the display gray value.

Figure 3:
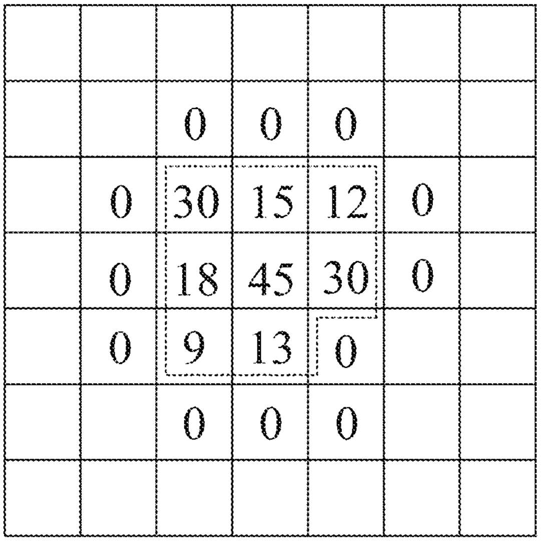
FIG. 3 is a schematic diagram illustrating a connected domain provided by an embodiment of the present disclosure.

FIG. 3 is a schematic diagram of a connected domain provided by an embodiment of the present disclosure. As shown in FIG. 3, a connected domain consisting of positive backlight values can be obtained through the backlight matrix. One connected domain is delimitated by the dotted line in the figure. According to the connected domain, the adjustment scheme of backlight value at the boundary position of the connected domain is determined. As shown in FIG. 3, the boundary positions of the connected domain are the positions where the backlight values are 30, 15, 12, 30, 13, 9 and 18 respectively. By adjusting the backlight values at these boundary positions, the backlight halation can be alleviated. FIG. 3 is used to schematically illustrate the connected domain and its boundary positions, without limiting in other aspects.

In the backlight adjustment method provided by the embodiment of the present disclosure, different connected domains can choose different adjustment schemes for the backlight value at the boundary position, so that the problem of backlight halation can be solved more effectively for various objects on the display screen, and the problem of abnormal adjustment for backlight value or disappearance of backlight value can be avoided.

In addition, the problem of backlight halation can be solved by the backlight value without adding other chips, which can be realized by the scaler card of the display device, thus reducing the cost and shortening the development period.

It should be noted that the boundary position of a connected domain refers to that: the backlight value at at least one adjacent position of the boundary position is zero, or the backlight value at at least one adjacent position is smaller than or equal to a preset value; for example, the preset value can be 3. All the boundary positions of the connected domain constitute the boundary of the connected domain. By adjusting the backlight values at the boundary positions of the connected domain, the problem of backlight halation can be alleviated. For the connected domain and the boundary positions of the connected domain, reference can be made to the following embodiments and diagrams.

In some examples, in step S400, the adjustment scheme of the backlight value at the boundary position of the connected domain is determined, which includes:

S410, acquiring a first parameter according to the connected domain;

S420, setting a first parameter threshold, and comparing the first parameter with the first parameter threshold;

S430, if the first parameter is smaller than or equal to the first parameter threshold, adjusting the backlight value at the boundary position of the connected domain by adopting a first adjustment scheme;

S440, if the first parameter is greater than the first parameter threshold, adjusting the backlight value at the boundary position of the connected domain by adopting the first adjustment scheme or a second adjustment scheme, wherein the first adjustment scheme and the second adjustment scheme are different.

In some examples, the first parameter may be a ratio of the perimeter of the connected domain to the perimeter of the backlight region. For example, the first parameter may also be the ratio of the area of the connected domain to the area of the backlight region. Of course, the embodiment of the present disclosure does not limit the first parameter.

In some examples, the first parameter threshold may be $1/10$. For example, first parameter threshold is any value that is greater than or equal to $1/10$. Of course, the embodiment of the present disclosure does not limit the first parameter threshold.

Through the first parameter and the first parameter threshold, the size relationship between the connected domain and the backlight region can be judged. For example, when the first parameter is smaller than or equal to the first parameter threshold, the connected domain accounts for a relatively small proportion in the backlight region. For example, when the first parameter is greater than the first parameter threshold, the connected domain accounts for a relatively large proportion in the backlight region. It should be noted that the "large" and "small" here refer to relative values, not absolute values.

For example, objects in an image can be classified into large objects and small objects. For example, when the first parameter is smaller than or equal to the first parameter threshold, it is determined that the object is a small object, so that the backlight of the small object can choose the first adjustment scheme. For example, when the first parameter is greater than the first parameter threshold, it is determined that the object is a large object. For a large object, further determination can be made to decide whether to select the first adjustment scheme or the second adjustment scheme. It should be noted that the large objects and small objects here are described with respect to the backlight region instead of absolute large objects and absolute small objects, and are related to the setting of the first parameter threshold. The introduction of concepts of large objects and small objects are only used to illustrate the selection of the first adjustment scheme and the second adjustment scheme, but not to limit the selection of the first adjustment scheme and the second adjustment scheme.

In some examples, in step S440, after determining that the first parameter is greater than the first parameter threshold, the backlight adjustment method further includes:

S441, acquiring a second parameter according to the connected domain;

S442, setting a second parameter threshold, and comparing the second parameter with the second parameter threshold;

S443, if the second parameter is smaller than or equal to the second parameter threshold, adjusting the backlight value at the boundary position of the connected domain by adopting the second adjustment scheme;

S444, if the second parameter is greater than the second parameter threshold, determining whether to adopt the first adjustment scheme according to a third parameter.

In some examples, the second parameter includes the ratio of the maximum boundary distance to the minimum boundary distance of the connected domain. Of course, the embodiment of the present disclosure does not limit the second parameter.

It should be noted that the maximum and minimum boundary distances of a connected domain can be obtained by the following methods: taking a first point at the boundary of the connected domain discretionarily; determining a tangent line of the first point, wherein a perpendicular line, passing through the first point, of the tangent line passes through the connected domain and intersects with the boundary of the connected domain at a second point; and defining a line segment distance between the first point and the second point as the boundary distance. By traversing all the points on the boundary of the connected domain, all the boundary distances can be obtained. Among all the boundary distances as obtained, the distance with the smallest value is referred to as the minimum boundary distance and the distance with the largest value is referred to as the maximum boundary distance.

In some examples, the second parameter threshold may be 3, for example, the second parameter threshold may be any positive integer greater than or equal to 3. Of course, the embodiment of the present disclosure does not limit the second parameter threshold.

The second parameter and the second parameter threshold can be used to judge the approximate shape of an object. For example, if the second parameter is smaller than or equal to the second parameter threshold, the ratio of the maximum boundary distance to the minimum boundary distance of the connected domain is smaller than 3, so that the size of the object in any direction is relatively balanced, and there is no excessively larger or smaller size in a certain direction. It should be noted that the large and small here refer to relative values, not absolute values.

For example, the above-mentioned large objects can also be classified into normal large objects and extremely large objects. For example, when the second parameter is smaller than or equal to the second parameter threshold, it is determined that the object is a normal large object, so that the backlight of the normal large object can choose the second adjustment scheme. For example, when the second parameter is greater than the second parameter threshold, further judgment can be made for the large object to determine whether to select the first adjustment scheme or the second adjustment scheme. It should be noted that the normal large objects and extremely large objects (such as extremely narrow long strips or fine lines) here are described with respect to the boundary distance of the connected domain and are related to the setting of the second parameter threshold. The introduction of concepts of normal large objects and extremely large objects are only used to illustrate the selection of the first adjustment scheme and the second adjustment scheme, but not to limit the selection of the first adjustment scheme and the second adjustment scheme.

In some examples, in step S444, after determining that the second parameter is greater than the second parameter threshold, the backlight adjustment method further includes:

- S4441, acquiring the third parameter according to the connected domain;
- S4442, setting a third parameter threshold, and comparing the third parameter with the third parameter threshold;
- S4443, if the third parameter is smaller than or equal to the third parameter threshold, adjusting the backlight value at the boundary position of the connected domain by adopting the first adjustment scheme;
- S4444, if the third parameter is greater than the third parameter threshold, adjusting the backlight value at the boundary position of the connected domain by adopting the second adjustment scheme.

In some examples, the third parameter includes the ratio of the minimum boundary distance of the connected domain to the minimum boundary distance of the backlight region. Of course, the embodiment of the present disclosure does not limit the third parameter.

It should be noted that the minimum boundary distance of the backlight region is the smallest value among the boundary distances of the backlight region. For example, when the backlight region is in the shape of a rectangle, the minimum boundary distance of the backlight region is the length of the short side of the rectangle.

In some examples, the third parameter threshold may be $1/10$. For example, the third parameter threshold is any value that can be greater than or equal to $1/10$. Of course, the embodiment of the present disclosure does not limit the third parameter threshold.

Through the third parameter and the third parameter threshold, the objects can be further screened. For example, if the third parameter is smaller than or equal to the third parameter threshold, the ratio of the minimum boundary distance of the connected domain to the minimum boundary distance of the backlight region is smaller than or equal to $1/10$, so that the size of the object in a certain direction is relatively smaller relative to the minimum boundary distance of the backlight region, for example, the object can be an extremely narrow long strip or long fine line. For example, if the third parameter is greater than the third parameter threshold, the ratio of the minimum boundary distance of the connected domain to the minimum boundary distance of the backlight region is greater than $1/10$, so that the minimum size of the object relative to the minimum boundary distance of the backlight region is greater than a preset value, which can also be understood as that, there is no relatively small size for the object relative to the minimum boundary distance of the backlight region. It should be noted that the large and small here refer to relative values, not absolute values.

For example, the above-mentioned large objects can also be classified into normal large objects and extremely large objects. When the third parameter is smaller than or equal to the third parameter threshold, it is determined as an extremely large object, so the backlight of the extremely large object can choose the first adjustment scheme. For example, when the third parameter is greater than the third parameter threshold, it is determined that the object is a normal large object, so that the backlight of the normal large object can choose the second adjustment scheme. For example, the extremely large object here can be understood as that, the size of the large object in at least one direction is relatively smaller relative to the minimum boundary distance of the backlight region. The normal large objects are the large objects except the extremely large objects.

Through the first parameter, the first parameter threshold, the second parameter, the second parameter threshold, the third parameter and the third parameter threshold, the adjustment scheme of the backlight value at the boundary position of the connected domain can be determined, so that different adjustment schemes for backlight value can be selected depending on various objects.

For example, the perimeter or area of the connected domain of some special graphs, such as extremely narrow long strips or long fine lines, may be larger than the first parameter threshold, but the halation processing method of these special graphs cannot be the same as that of the squares and other graphs having the same perimeter or area for the connected domain. Therefore, through multiple parameters and corresponding parameter thresholds, the objects can be classified more accurately, so that the appropriate backlight adjustment schemes can be selected and the backlight can be optimized better.

Figure 4:
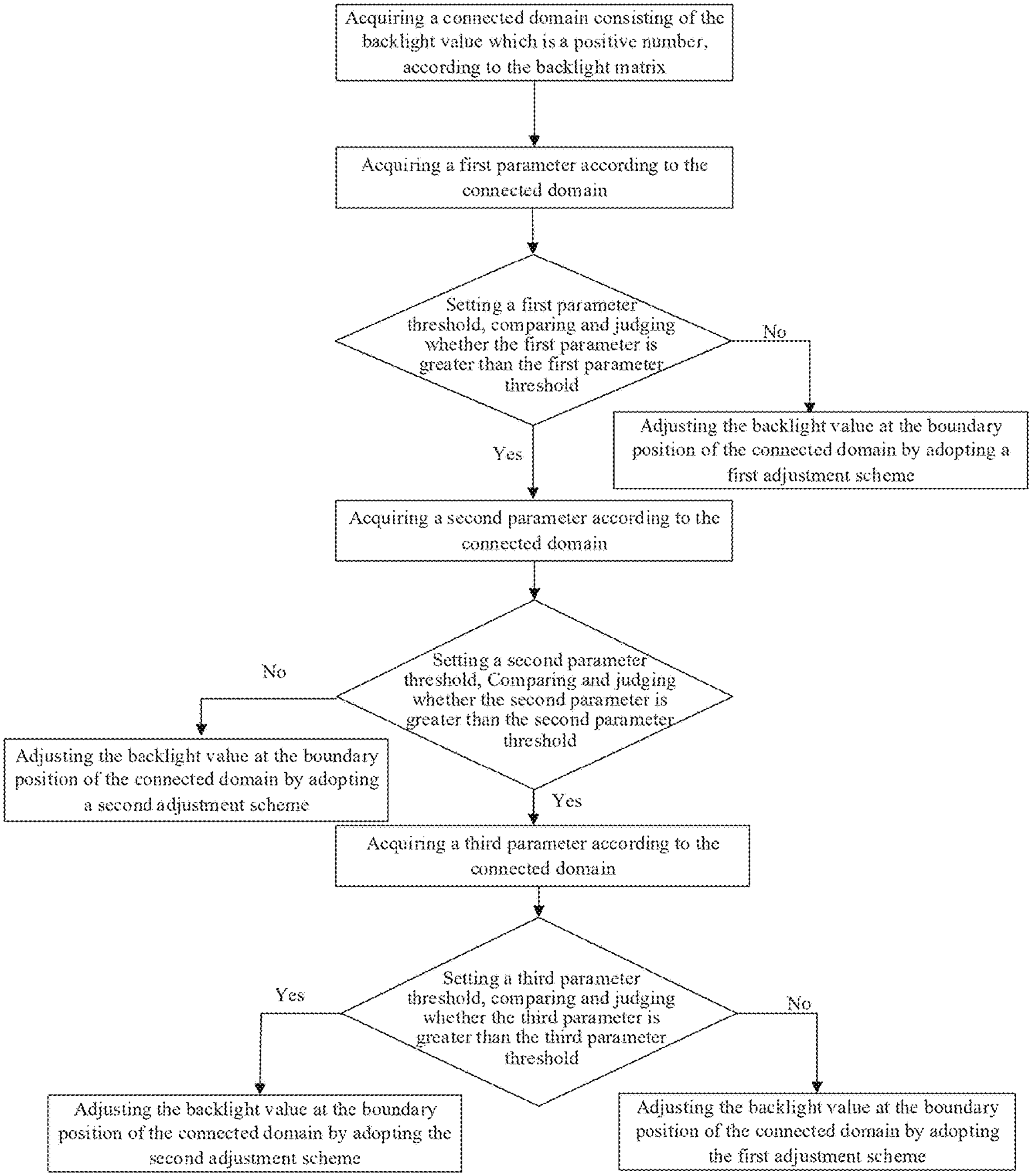
FIG. 4 is a flowchart of an adjustment scheme for determining a backlight value at a boundary position of a connected domain according to the connected domain provided by an embodiment of the present disclosure.

FIG. 4 is a flowchart of determining an adjustment scheme for a backlight value at a boundary position of a connected domain according to the connected domain provided by an embodiment of the present disclosure. Through this flowchart, an appropriate backlight value adjustment scheme can be selected for different connected domains, so that the problem of backlight halation can be solved more effectively for various objects on the display screen.

In some examples, the first adjustment scheme includes: multiplying the backlight value at the boundary position of the connected domain by a weighting coefficient. The second adjustment scheme includes: filtering the backlight value at the boundary position of the connected domain to adjust the backlight value at the boundary position of the connected domain.

For the object using the first adjustment scheme, its backlight value is generally small, so the change of backlight value will cause a considerable change in experience. Therefore, when adjusting the backlight value of the object, no considerable change in backlight value is allowed to occur. By changing the backlight value of the object with the weighting coefficient, it can avoid a considerable change in the backlight value, so as to alleviate and optimize the backlight halation of the object without affecting the experience to the object and the display effect of the object.

For example, the weighting coefficient can be any value smaller than 1. For example, the weighting coefficient ranges from 0.6 to 1. For example, the weighting coefficient can be valued as 0.9, 0.8, etc. Of course, the embodiment of the present disclosure does not limit the weighting coefficient.

For the object using the second adjustment scheme, its corresponding backlight region has relatively wider range, and the change of backlight value at its boundary position is not easy to cause a considerable change in experience; if the above-mentioned weighting coefficient is used for adjustment, it is not easy to achieve the effect of improving the light source. In addition, the backlight value at the boundary position is not necessarily the same at different moments for various objects; if the backlight value at the boundary position is reduced by the same proportion, the halation at the edge of the object will be sometimes large and sometimes small, which will affect the experience. By using the filtering method, not only the halation at the edge of the object can be alleviated obviously, but also the backlight values at boundary positions with different sizes can be self-adapted to avoid the problem of halation flicker.

In some examples, before filtering the backlight value at the boundary position of the connected domain, the method further includes: judging the number and the position(s) of the adjacent position(s), where the backlight value is zero, of the boundary position of the connected domain; and selecting a filtering operator according to the judging result.

Different filtering operators can be selected by judging the backlight value at the adjacent position of the boundary position. Choosing a suitable filtering operator based on the judging results can not only optimize the halation, but also avoid using unsuitable filtering operators, which not only hinders alleviating the halation, but also brings abnormal backlight change value.

In some examples, the backlight matrix includes a row direction and a column direction, and the number of adjacent positions of the boundary position is four. The four adjacent positions include a first adjacent position and a second adjacent position which are opposite to each other in the row direction, and a third adjacent position and a fourth adjacent position which are opposite to each other in the column direction, with the boundary position as the center. According to the judging result, a filtering operator is selected, which includes: if the backlight value at one of the first adjacent position and the second adjacent position is zero and the backlight value at one of the third adjacent position and the fourth adjacent position is zero, selecting an N*N type filtering operator or a "cross" type filtering operator; if the backlight value at one of the first adjacent position and the second adjacent position is zero, selecting a 1*N type filtering operator; and if the backlight value at one of the third adjacent position and the fourth adjacent position is zero, selecting an N*1 filtering operator. N is an odd number greater than or equal to 3.

By judging the number and the position(s) of the adjacent position(s), where the backlight value is zero, of the boundary position, an appropriate filtering operator can be selected, so that the backlight value at the boundary position can be better optimized for alleviating the halation.

Figure 5:
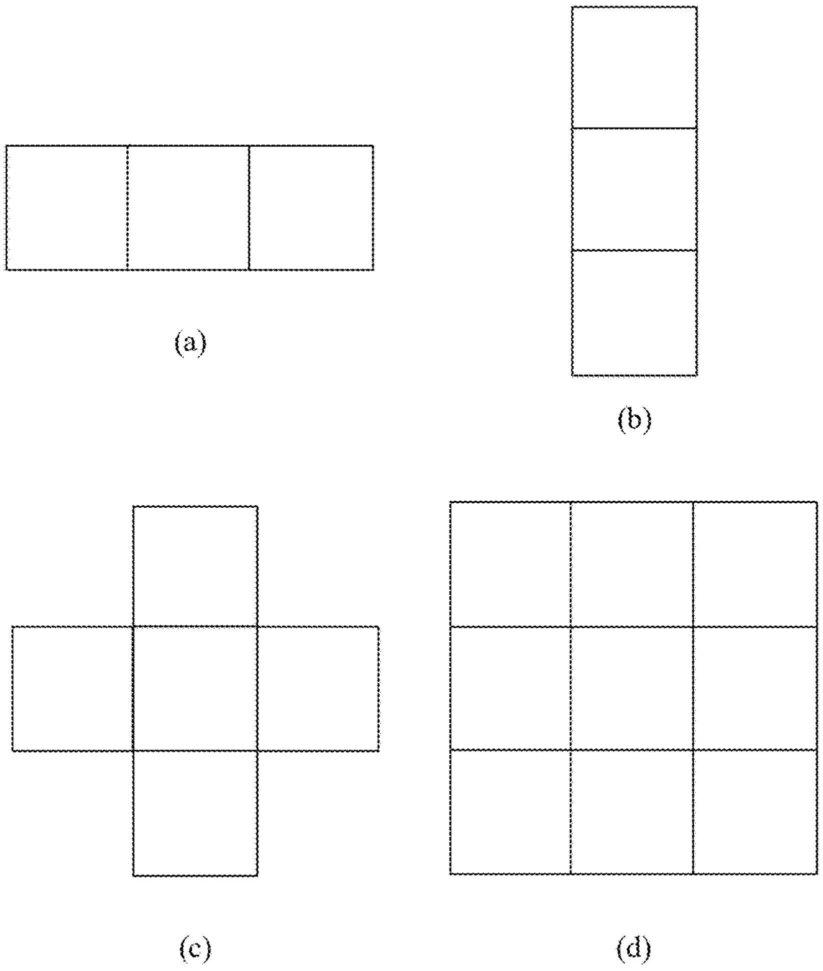
FIG. 5 is a schematic diagram illustrating a filtering operator provided by an embodiment of the present disclosure.

FIG. 5 is a schematic diagram of a filtering operator provided by an embodiment of the present disclosure. As shown in FIG. 5, given that N=3, FIG. 5(*a*) shows a 1*3 type filtering operator, FIG. 5(*b*) shows a 3*1 type filtering operator, FIG. 5(*c*) shows a "cross" type filtering operator, and FIG. 5(*d*) shows a 3*3 type filtering operator. FIG. 5 only schematically shows four types of filtering operators, but does not limit the filtering operators of the embodiment of the present disclosure.

In some examples, as shown in FIG. 3 and FIG. 5, among the boundary positions of the connected domain, for the boundary position corresponding to the backlight value of 15, the backlight values at the first and second adjacent positions thereof are 30 and 12 respectively, i.e., the backlight values at both the first and second adjacent positions thereof are not zero, and one of the backlight values at the third and fourth adjacent positions thereof is zero; therefore, the N*1 type filtering operator is selected for filtering processing at this boundary position. By selecting the N*1 type filtering operator, it can better perform halation optimization for the backlight value, so that the adjusted backlight value is closer to a direction where the adjacent position with a backlight value of zero is located; in this example, the direction is the column direction, so as to avoid the influence on halation optimization caused by backlight values at the boundary position in other directions.

It should be noted that FIG. 3 is used to schematically illustrate how to select suitable filtering operators at different boundary positions, without limiting in other aspects.

For example, as shown in FIG. 3 and FIG. 5, the boundary position where the backlight value is 15 is filtered by using a 3*1 type average filtering operator, and the calculation formula of the filtering processing of the backlight value at this boundary position is: (0+15+45)/3=20.

For example, as shown in FIGS. 3 and 5, for the boundary position corresponding to the backlight value of 18, one of the backlight values at the first adjacent position and the second adjacent position thereof is 0, and the backlight values at the third adjacent position and the fourth adjacent position thereof are 30 and 9 respectively, i.e., the backlight values at both the third adjacent position and the fourth adjacent position thereof are not zero. Therefore, the 1*N type filtering operator is selected for the boundary position for filtering processing. By selecting the 1*N type filtering operator, it can better perform halation optimization for the backlight value, so that the adjusted backlight value is closer to a direction where the adjacent position with a backlight value of zero is located; in this example, the direction is the row direction, so as to avoid the influence on halation optimization caused by backlight values at the boundary position in other directions.

For example, as shown in FIG. 3 and FIG. 5, the boundary position where the backlight value is 18 is filtered by using a 1*3 type average filtering operator, and the calculation formula of the filtering processing of the backlight value at this boundary position is: (0+18+45)/3=21.

For example, as shown in FIGS. 3 and 5, for the boundary position corresponding to the backlight value of 30, one of the backlight values at the first adjacent position and the second adjacent position thereof is zero, and one of the backlight values at the third adjacent position and the fourth adjacent position thereof is zero. Therefore, the N*N type filtering operator or the "cross" type filtering operator is selected for the boundary position for filtering processing.

By selecting the N*N type filtering operator or the “cross” type filtering operator, it can comprehensively consider the backlight values at the adjacent positions or the surrounding positions of the boundary position, that is, the backlight values in the row direction and the column direction can be considered at the same time, so that the halation optimization can be better performed on the backlight values.

For example, as shown in FIGS. 3 and 5, the boundary position where the backlight value is 30 is filtered by using a “cross” type average filtering operator, and the calculation formula of the filtering processing of the backlight value at this boundary position is: (0+30+18+0+15)/5=12.

In the same way, the above method is used to filter all the boundary positions of the connected domain in turn, so as to realize the halation optimization of the backlight of the object.

Different backlight adjustment schemes are selected for various objects, which can also avoid the problem of disappearance of backlight value. For example, for some special graphics, such as extremely narrow long strips or fine lines, the short-side direction may only correspond to one or two backlight values; if the backlight value is adjusted by using the filtering operator, for example, using the 1*3 type filtering operator or the 3*1 type filtering operator, the backlight value may be reduced too much, and the preset brightness cannot be achieved, resulting in the problem that the backlight value disappears. Through the above parameters and corresponding parameter thresholds, these special graphs can be accurately screened out, so that the first adjustment scheme can be selected to avoid the abnormal adjustment of backlight value, such as the disappearance of backlight value.

In some examples, acquiring a plurality of backlight matrices corresponding to the plurality of frames of images includes: acquiring backlight matrices corresponding to any two adjacent frames of images. It should be noted that each frame of image among the plurality of frames of images corresponds to one backlight matrix. For example, the plurality of frames of images include at least three frames of images. For example, the plurality of frames of images include a previous frame of image, a current frame of image and a next frame of image. For example, two adjacent frames of images include a previous frame of image and a current frame of image, or, a current frame of image and a next frame of image.

Figure 6:
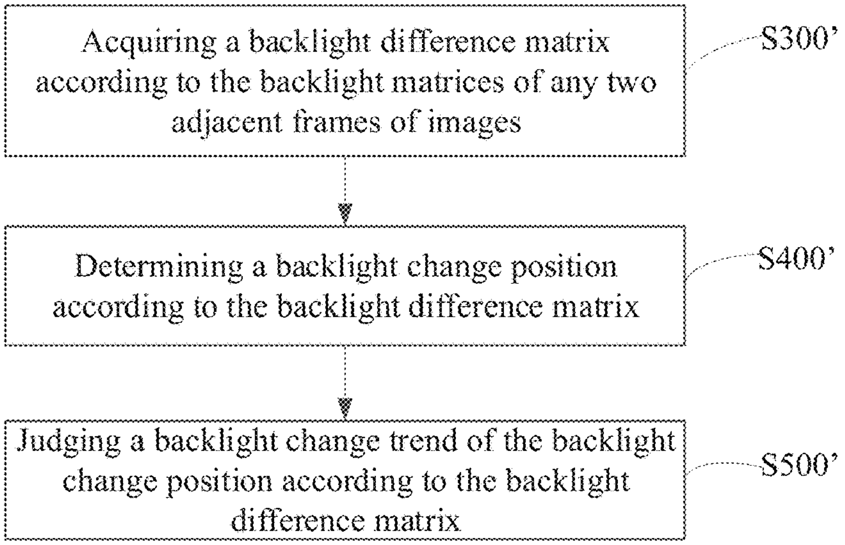
FIG. 6 is a flowchart of another backlight adjustment method provided by an embodiment of the present disclosure.

FIG. 6 is a flowchart of another backlight adjustment method provided by an embodiment of the present disclosure. As shown in FIG. 6, the backlight adjustment method further includes:

- S300', acquiring a backlight difference matrix according to the backlight matrices of any two adjacent frames of images;
- S400', determining a backlight change position according to the backlight difference matrix; and
- S500', judging a backlight change trend of the backlight change position according to the backlight difference matrix.

In the embodiment of the present disclosure, the backlight change position and the backlight change trend of the backlight change position can be determined through the backlight difference matrix, so that the backlight can be optimized for alleviating problems such as flickers and smearing of moving objects on the display screen. When an object is moving, the flicker and smearing of the moving object mainly appear at the edge of the backlight of the object, and the part that needs to be optimized is the part where the backlight changes. Therefore, the essence of backlight optimization is to optimize the part where the backlight changes. Through the backlight difference matrix, it can simply and effectively determine the backlight change position, the backlight difference value and the backlight change trend, so as to simply and effectively optimize the backlight for alleviating problems such as flickers and smearing of moving objects. For example, the backlight optimization method can be used to alleviate the problems such as flickers and smearing of the backlight of high-refresh rate displays (e.g., E-sports displays).

In addition, the backlight optimization through backlight difference matrix for alleviating problems such as flickers and smearing of moving objects can be realized through the scaler board of the display device without adding other chips, thus reducing the cost and shortening the development period. The existing methods, such as sliding window method and deep learning method, rely on large-scale calculations and involve highly-complicated algorithms, and hence are not suitable for real-time backlight optimization of independent scaler boards.

In some examples, the backlight difference matrix can also be used to predict the backlight change speed. For example, it can be judged according to the number of positive values in the backlight difference matrix. If the number of positive values in the backlight difference matrix is high, it means that the backlight changes at a fast speed; otherwise, it means that the backlight changes at a slow speed.

In some examples, the difference between the backlight value of the $n^{th}$ frame and the backlight value of the $n-1^{th}$ frame indicates the difference value of the backlight.

Figure 7:
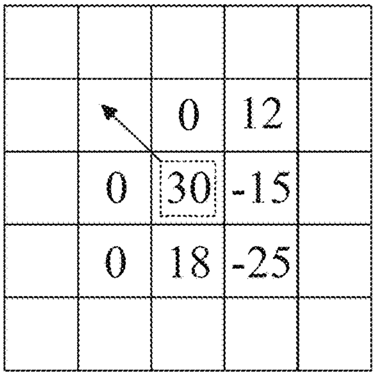
FIG. 7 is a schematic diagram illustrating a backlight difference matrix provided by an embodiment of the present disclosure.
Figure 7:
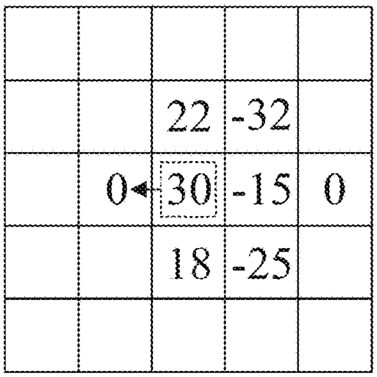

FIG. 7 is a schematic diagram of a backlight difference matrix provided by an embodiment of the present disclosure. As shown in FIG. 7, the difference values in the backlight difference matrix include zero, positive numbers or negative numbers.

In some examples, determining the backlight change position according to the backlight difference matrix includes: if the difference value in the backlight difference matrix is a positive number or a negative number, it is determined that a position where the difference value is located is the backlight change position.

For example, if the difference value at the backlight change position is a positive number, it means that the backlight value of the backlight subregion where the backlight change position is located increases as compared with the backlight value of the previous frame; if the difference value at the backlight change position is a negative number, it means that the backlight value of the backlight subregion where the backlight change position is located decreases as compared with the backlight value of the previous frame; if the difference value at the backlight change position is zero, it means that the backlight value of the backlight subregion where the backlight change position is located has not changed as compared with the backlight value of the previous frame.

In some examples, in step S500', judging the backlight change trend of the backlight change position according to the backlight difference matrix includes:

- S510', determining the backlight change position where the difference value is a positive number, according to the backlight difference matrix;
- S520', judging whether a difference value, at an adjacent position of the backlight change position where the difference value is a positive number, is zero;
- S530', judging the backlight change trend of the backlight change position according to a judging result.

By judging whether the difference value at the adjacent position of the backlight change position where the difference value is a positive number is zero, the backlight change trend of the backlight change position can be simply and effectively determined, so that the backlight optimization can be simply and effectively performed for alleviating problems such as flickers and smearing of moving objects.

Figure 8:
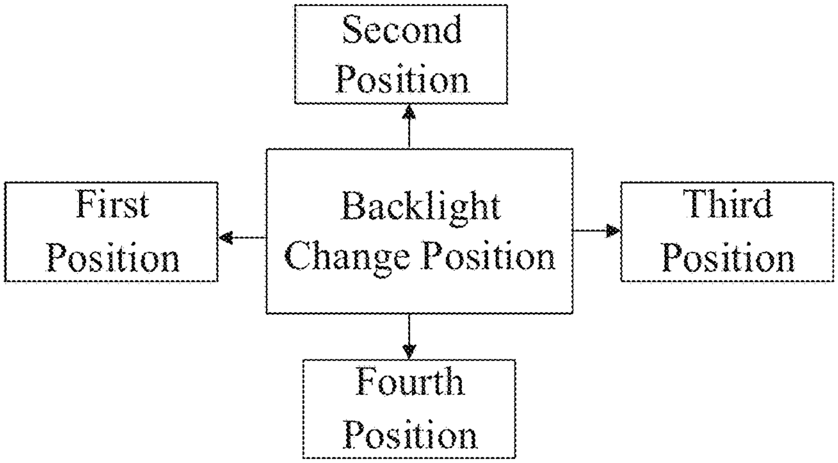
FIG. 8 is a schematic diagram illustrating a backlight change position and an adjacent position thereof provided by an embodiment of the present disclosure.

FIG. 8 is a schematic diagram of a backlight change position and its adjacent position provided by an embodiment of the present disclosure. As shown in FIG. 8, the adjacent positions of the backlight change position include a first position, a second position, a third position and a fourth position which are arranged clockwise around the backlight change position as a center. FIG. 8 is only used to schematically illustrate four adjacent positions of the backlight change position.

In some examples, in step S530', judging the backlight change trend of the backlight change position according to the judging result includes:

- S531': if the difference value at only one of the first position, the second position, the third position and the fourth position is zero, the backlight change trend of the backlight change position is towards the position where the difference value is zero;
- S532': if the difference values at any two adjacent positions of the first position, the second position, the third position and the fourth position are zero, the backlight change trend of the backlight change position is towards a gap between the two adjacent positions; and
- S533': if the difference values at any three positions of the first position, the second position, the third position and the fourth position are zero, the backlight change trend of the backlight change position is in a direction away from the only one position where the difference value is not zero among the four positions.

It should be noted that any two adjacent positions of the first position, the second position, the third position and the fourth position refer to two positions adjacent in the clockwise direction; for example, the first position and the second position are adjacent positions, the second position and the third position are adjacent positions, the third position and the fourth position are adjacent positions, and the fourth position and the first position are adjacent positions.

In some examples, if none of the difference values at the first position, the second position, the third position and the fourth position is zero, the backlight change trend of the backlight change position can be judged by combining the current frame of image with the next frame of image.

In some examples, if the difference values at two nonadjacent positions of the first position, the second position, the third position and the fourth position are not zero, and the difference values at the other two nonadjacent positions are zero, for example, if the difference values at the first position and the third position are not zero and the difference values at the second position and the fourth position are zero, it may seek for the position where the difference value is a positive number and the position where the difference value is zero along a direction of the connecting line which connects the first position to the third position, so as to judge the backlight change trend at the position where the difference value is a positive number.

As shown in FIG. 7(*a*), in the backlight difference matrix, the position where the difference value 30 is located is the backlight change position; referring to the definition of adjacent positions in FIG. 8, the difference values at the first position and the second position are zero, and the difference values at the third position and the fourth position are not zero; the backlight change trend of this backlight change position is towards the gap between the first position and the second position, as shown by the arrow in the figure. In the backlight difference matrix shown in FIG. 7(*b*), the position where the difference value 30 is located is the backlight change position; referring to the definition of adjacent positions in FIG. 8, the difference value at the first position is zero, and the difference values at the second position, the third position and the fourth position are not zero; the backlight change trend of this backlight change position is towards the first position, as shown by the arrow in the figure. It should be noted that FIG. 7 is only used to schematically explain how to judge the backlight change trend at the backlight change position, without limiting in other aspects.

In some examples, the backlight adjustment method further includes:

- S600': adjusting the backlight value at the adjacent position of the backlight change position according to the backlight change trend, wherein the difference value at the adjacent position of the backlight change position is zero.

By adjusting the backlight value at the adjacent position of the backlight change position according to the backlight change trend, it can realize the smooth operation of backlight, thus alleviating the flickers of moving objects.

When a moving object moves rapidly, its backlight also changes obviously, which is especially serious for a small moving object. When the backlight changes obviously, it is reflected, in the visual experience, as backlight flicker, with the essential reason that the backlight values of adjacent frames change greatly, that is, the difference value of the backlight is large. For example, the problem of backlight flicker may be actually manifested as the backlight value of a certain backlight subregion suddenly changing from zero to a larger backlight value, or suddenly changing from a larger backlight value to zero; it is also possible that the backlight value of a certain backlight subregion suddenly changes from a smaller backlight value to a larger backlight value, or suddenly changes from a larger backlight value to a smaller backlight value. According to the backlight change trend, the backlight value at the adjacent position of the backlight change position can be adjusted, so that the difference value of backlight can be prevented from changing greatly, and that the problem of backlight flicker can be solved.

In some examples, in step S600', adjusting the backlight value at the adjacent position of the backlight change position according to the backlight change trend includes:

- S610': determining the backlight change position where the difference value is a positive number;
- S620': determining a fifth position adjacent to the backlight change position where the difference value is a positive number and a sixth position adjacent to the fifth position along the backlight change trend; and
- S630': adjusting the backlight value at the fifth position.

In some examples, the backlight value at the fifth position is calculated by nonlinear interpolation through a calculation formula of:

$$y_{i,j}^{t} = \alpha \times \frac{y_{i-1,j}^{t-1} + y_{i+1,j}^{t-1}}{2}; \text{ or } y_{i,j}^{t} = \alpha \times \frac{y_{i,j-1}^{t-1} + y_{i,j+1}^{t-1}}{2},$$

the backlight matrix includes a row direction and a column direction, i and j respectively represent a row direction index and a column direction index of the backlight matrix, $y^t$ represents the backlight value at a moment t of the backlight matrix, and a represents a self-adaptive adjustment parameter which is calculated through a formula of $$\alpha = \frac{y_{i,j}^{t-1}}{255}.$$

Different backlight values have different effects on human eyes. When the backlight value is large, subtle changes in the backlight will not cause obvious visual experience. When the backlight value is small, subtle changes in the backlight will be easily perceived by human eyes through visual senses. 255 is the maximum backlight value, $y^{t-1}$ is the backlight value at time t−1. The larger the $y^{t-1}$, the larger the self-adaptive adjustment parameter a will be; and the smaller the $y^{t-1}$, the smaller the self-adaptive adjustment parameter a will be. By introducing the self-adaptive adjustment parameter a, the backlight value at the fifth position can be interpolated in a nonlinear way, so that different backlight adjustments can be made for different backlight values; in this way, the backlight can be better adjusted, and the problem of backlight flicker can be better solved.

Figure 9:
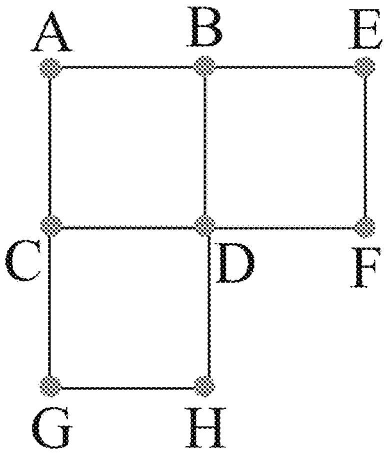
FIG. 9 is a schematic diagram illustrating nonlinear interpolation provided by an embodiment of the present disclosure.

FIG. 9 is a schematic diagram of nonlinear interpolation provided by an embodiment of the present disclosure. As shown in FIG. 9, each of the positions A, B, C, D, E, F, G and H corresponds to one backlight subregion or one backlight source, and the backlight difference value at position A is a positive number, that is, the position A is a backlight change position. The backlight change trend of position A can be determined by the method of determining the backlight change trend of the backlight change position provided in the previous embodiments, so the details thereof are not repeated here.

In some examples, as shown in FIG. 9, it is assumed that the backlight change trend of position A is towards position B, then position B corresponds to the above-mentioned fifth position, and position E corresponds to the above-mentioned sixth position. Based on the row direction index i and column direction index j of the fifth position, the backlight value at position B is calculated according to the calculation formula $$y_{i,j}^{t} = \alpha \times \frac{y_{i-1,j}^{t-1} + y_{i+1,j}^{t-1}}{2},$$

and the backlight value at position B is changed by nonlinear interpolation, so that the problem of backlight flicker can be solved. FIG. 9 is only used to schematically illustrate backlight interpolation without limiting in other aspects.

In some examples, as shown in FIG. 9, it is assumed that the backlight change trend of position A is towards position C, then position C corresponds to the above-mentioned fifth position, and position G corresponds to the above-mentioned sixth position. Based on the row direction index i and column direction index j of the fifth position, the backlight value at position C is calculated by the calculation formula $$y_{i,j}^{t} = \alpha \times \frac{y_{i,j-1}^{t-1} + y_{i,j+1}^{t-1}}{2},$$

and the backlight value at position C is changed by nonlinear interpolation, so that the problem of backlight flicker can be solved.

According to the method for judging the backlight change trend of the backlight change position provided in the previous embodiments, a set of backlight change positions that need interpolation can be obtained, and then all the elements in the set are interpolated in turn by using the above method, so as to complete backlight optimization and realize alleviation of backlight flicker.

In some examples, the backlight adjustment method further includes: adjusting the backlight value at the backlight change position to zero according to the backlight change trend.

In the embodiment of the present disclosure, the backlight value at the backlight change position is adjusted to zero according to the backlight change trend, so that the backlight can be turned off in advance according to the movement trend of the object, the problem of backlight delay is reduced or eliminated, and the problem of smearing is solved.

In the display system with regional dimming, the problem of backlight smearing is easy to occur, that is, the backlight lighting region cannot be aligned with the image display region, which will greatly affect the display effect. Especially, in the process of image objects moving fast, the problem of backlight smearing is particularly obvious. Since the backlight value is calculated based on the image, the backlight value cannot be obtained prior to the image, so this phenomenon cannot be solved by technical means. According to the backlight change trend, the backlight value at the backlight change position is adjusted to zero, so that the problem of smearing can be solved and the backlight can be matched with the image.

In some examples, adjusting the backlight value at the backlight change position to zero according to the backlight change trend further includes: if the difference value at the backlight change position is a negative number and the difference value at the adjacent position of the backlight change position is zero, adjusting the backlight value at the backlight change position to zero.

In some examples, as shown in FIG. 7(*b*), the difference value, at the adjacent position of a position where the difference value is −15, is zero, then adjusting the backlight value at the position, where the difference value is −15 is located, to be zero, so that the problem of backlight delay and the problem of smearing at this position can be solved.

In some examples, the backlight adjustment method further includes: acquiring the backlight matrix according to a display gray value of the image.

In some examples, there are many different methods to obtain a backlight value of a corresponding backlight subregion according to each image subregion of the image. For example, a maximum value method, an average value method, a cumulative distribution function (CDF) method or a dynamic threshold method can be used. For example, the maximum value method is to use the maximum display gray value among a plurally of display gray values of a plurally of pixel points in each image subregion to calculate the backlight value of the backlight subregion, which can improve the display brightness of the backlight subregion but is prone to result in sudden change of backlight and cause problem of backlight flicker. For example, the average value method is to use the average display gray value of a plurally of display gray values of a plurally of pixel points in each image subregion to calculate the backlight value of the backlight subregion. Compared with the maximum value method, the average value method can save power consumption, but will lead to insufficient display brightness and easily lose tiny pixels.

In some examples, acquiring the backlight matrix according to the display gray value of the image includes: acquiring a maximum display gray value and an average display gray value of each image subregion according to the display gray values of the plurality of pixel points of each image subregion; and weighting the maximum display gray value and the average gray value of each image subregion to obtain the backlight value of the backlight subregion corresponding to the image subregion.

By weighting the maximum display gray value and the average display gray value of an image subregion to calculate the backlight value of the corresponding backlight subregion, the advantages of the maximum value method and the average value method can be combined, and the problem of sudden change of backlight caused by the maximum value method and the problem of insufficient display brightness caused by the average value method can be solved, so that the calculated backlight value can be more optimized. It should be noted that the sum of the weighting coefficient of the maximum display gray value and the weighting coefficient of the average display gray value equals to 1, and the embodiment of the present disclosure does not limit the weighting coefficients of the maximum display gray value and the average display gray value. For example, the weighting coefficients of the maximum display gray value and the average display gray value may be both 0.5, or may be any other values.

In some examples, the weighting coefficients of the maximum display gray value and the average display gray value can be dynamically adjusted according to different image frames or display scenes, so that the calculated backlight value can be more optimized. For example, in the case where at the image is bright, the weighting coefficient of the average display gray value is greater than that of the maximum display gray value, so that the weight of the maximum display gray value can be reduced and the problem of sudden change of backlight can be solved. For example, in the case where image pictures are frequently switched, the weighting coefficient of the average display gray value can be made greater than that of the maximum display gray value, thus solving the problem of sudden change of backlight caused by screen switching.

Figure 10:
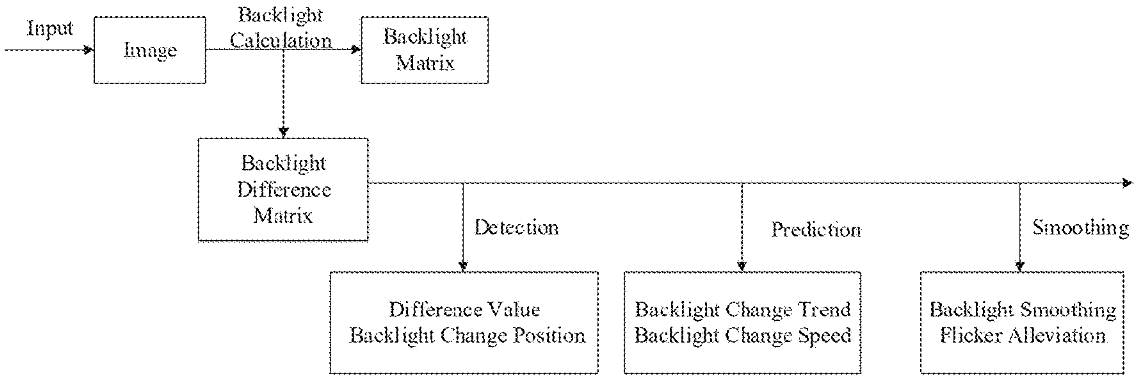
FIG. 10 is a flowchart of a backlight adjustment method provided by an embodiment of the present disclosure.

FIG. 10 is a flowchart of a backlight adjustment method provided by an embodiment of the present disclosure. As shown in FIG. 10, the flow of the backlight adjustment method is as follows:

A backlight value is calculated according to an input image to obtain a backlight matrix; and a backlight difference matrix is obtained through the backlight matrix. The backlight difference matrix is used to: detect the difference value and the backlight change position; predict the backlight change trend and backlight change speed; smooth the backlight change position to reduce or alleviate backlight flicker. Therefore, the backlight adjustment method can realize detection, prediction and smoothing, and realize backlight optimization.

Figure 11A:
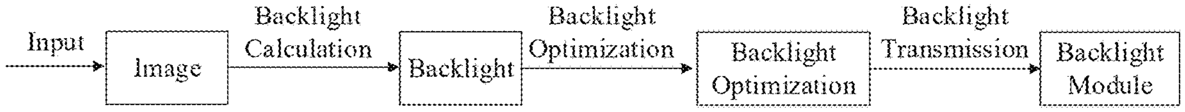
FIG. 11A is a flowchart of a backlight adjustment provided by an embodiment of the present disclosure.

FIG. 11A is a flowchart of backlight adjustment provided by an embodiment of the present disclosure. As shown in FIG. 11A, the backlight adjustment process includes:

Step 1, image input; for example, the image is input into the backlight adjustment system through a multimedia interface, including but not limited to a High-Definition Multimedia Interface (HDMI), a Video Graphics Array (VGA) interface, a DisplayPort (DP) or a Digital Visual Interface (DVI), etc., which is not limited in the embodiment of the present disclosure;

Step 2, backlight calculation; that is, the backlight value of the image is calculated according to the pixel value of the input image;

Step 3, backlight optimization; that is, the backlight value is optimized by any of the above backlight adjustment methods, so as to improve the display effect;

Step 4, backlight output; that is, the optimized backlight value is output to the backlight display module and used to drive the backlight source; for example, the backlight display module is a part of the backlight module, so that the conversion and mapping between the backlight value and the driving signal (such as driving current) is realized through the backlight display module, thereby realizing the lighting of the backlight source.

Figure 11B:
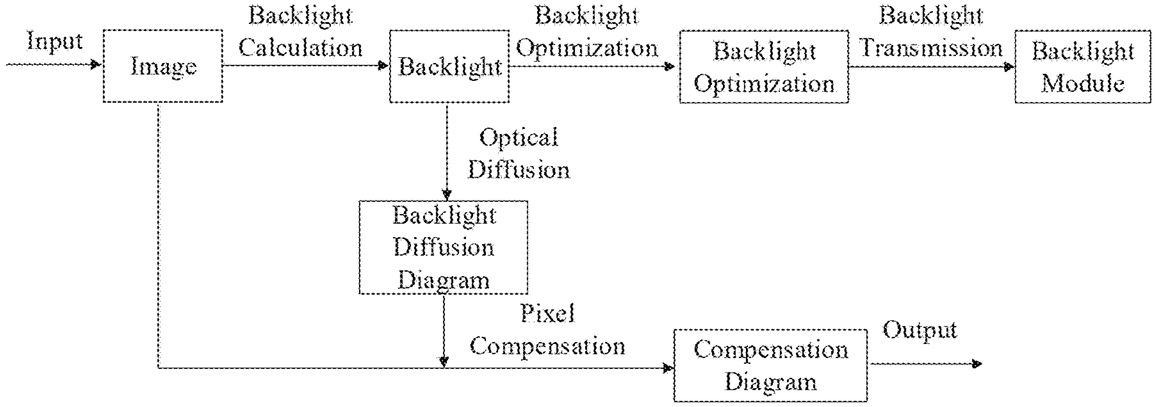
FIG. 11B is a flowchart of another backlight adjustment provided by an embodiment of the present disclosure.

FIG. 11B is a flowchart of another backlight adjustment provided by an embodiment of the present disclosure. As shown in FIG. 11B, the above backlight adjustment process may further include:

Step 5, backlight diffusion; the purpose of backlight diffusion is to simulate the optical diffusion process of backlight, so as to obtain the backlight value corresponding to the actual pixel point;

Step 6, pixel compensation; the pixel compensation is performed on the output image before the image is output; for example, backlight adjustment will cause the pixel point of the image in the region with small backlight value to be unable to be lighted, which is reflected in a subjective feeling that the details of the image are lost; in order to make up for the loss of image details, the pixel points in the region with small backlight value are compensated; for example, the compensation method is used to increase the value of the pixel point;

Step 7: compensated image output; the compensated image is used for displaying.

Figure 12:
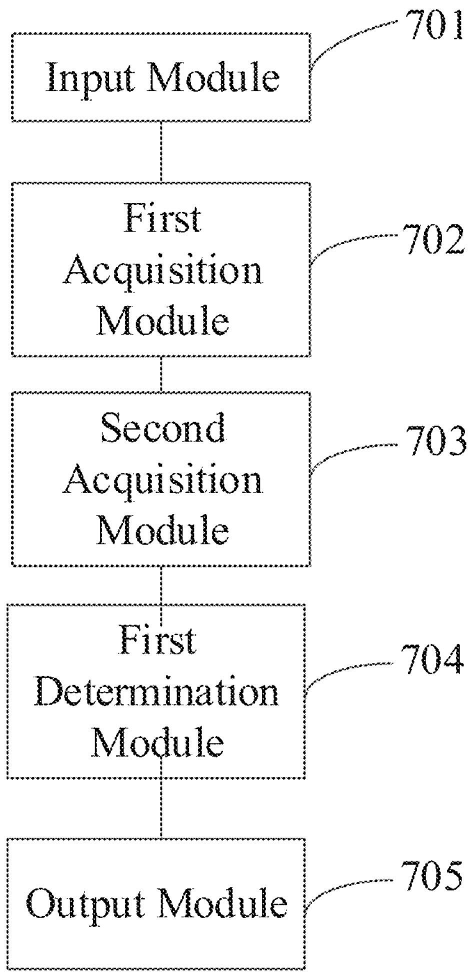
FIG. 12 is a schematic diagram of a backlight adjustment device provided by an embodiment of the present disclosure.

Based on the same inventive concept, an embodiment of the present disclosure further provides a backlight adjustment device for a display device. FIG. 12 is a schematic diagram of a backlight adjustment device provided by an embodiment of the present disclosure. As shown in FIG. 12, the backlight adjustment device includes an input module 701, a first acquisition module 702, a second acquisition module 703, a first determination module 704 and an output module 705. The input module 701 is configured to input a plurality of frames of images to a display device; the first acquisition module 702 is configured to acquire a plurality of backlight matrices corresponding to the plurality of frames of images, wherein the backlight matrix includes a plurality of backlight values; the second acquisition module 703 is configured to acquire a connected domain consisting of a backlight value which is a positive number according to the backlight matrix; the first determination module 704 is configured to determine an adjustment scheme of the backlight value at a boundary position of the connected domain according to the connected domain; and the output module 705 is configured to output the adjusted backlight matrix to a backlight display module.

Because the principle of the backlight adjustment device in the embodiment of the present disclosure is similar to the above backlight adjustment method in the embodiment of the present disclosure, the implementation of the device can refer to the implementation of the method.

In some examples, the first determination module 704 is configured to: acquire a first parameter according to the connected domain; set a first parameter threshold, and compare the first parameter with the first parameter threshold; adjust the backlight value at the boundary position of the connected domain by adopting a first adjustment scheme if the first parameter is smaller than or equal to the first parameter threshold; adjust the backlight value at the boundary position of the connected domain by adopting the first adjustment scheme or a second adjustment scheme if the first parameter is greater than the first parameter threshold, wherein the first adjustment scheme and the second adjustment scheme are different.

In some examples, the first determination module 704 is further configured to: acquire a second parameter according to the connected domain; set a second parameter threshold, and compare the second parameter with the second parameter threshold; adjust the backlight value at the boundary position of the connected domain by adopting the second adjustment scheme if the second parameter is smaller than or equal to the second parameter threshold; determine whether to adopt the first adjustment scheme according to a third parameter if the second parameter is greater than the second parameter threshold.

In some examples, the first determination module 704 is further configured to: acquire the third parameter according to the connected domain; set a third parameter threshold, and compare the third parameter with the third parameter threshold; adjust the backlight value at the boundary position of the connected domain by adopting the first adjustment scheme if the third parameter is smaller than or equal to the third parameter threshold; adjust the backlight value at the boundary position of the connected domain by adopting the second adjustment scheme if the third parameter is greater than the third parameter threshold.

For the first adjustment scheme and the second adjustment scheme, reference can be made to the detailed description in the previous embodiments, and will not be repeated here.

In some examples, the first acquisition module 702 is configured to acquire the backlight matrices corresponding to any two adjacent frames of images.

In some examples, the backlight adjustment device further includes a third acquisition module, a second determination module and a judgment module. The third acquisition module is configured to acquire a backlight difference matrix according to the backlight matrices of any two adjacent frames of images, the second determination module is configured to determine a backlight change position according to the backlight difference matrix, and the judgment module is configured to judging a backlight change trend of the backlight change position according to the backlight difference matrix.

In some examples, the second determination module is configured to: if the difference value in the backlight difference matrix is a positive number or a negative number, it is determined that a position where the difference value is located is the backlight change position.

In some examples, the judgment module is configured to: determine the backlight change position where the difference value is a positive number according to the backlight difference matrix; judging whether the difference value, at an adjacent position of the backlight change position where the difference value is the positive number, is zero; and judging the backlight change trend of the backlight change position according to a judging result.

In some examples, the backlight adjustment device further includes a first adjustment module. The first adjustment module is configured to adjust the backlight value at the adjacent position of the backlight change position according to the backlight change trend.

In some examples, the first adjustment module is configured to: determine the backlight change position where the difference value is a positive number; determine a fifth position adjacent to the backlight change position where the difference value is a positive number and a sixth position adjacent to the fifth position along the backlight change trend; and adjust the backlight value at the fifth position.

In some examples, the backlight adjustment device further includes a second adjustment module. The second adjustment module is configured to adjust the backlight value at the backlight change position to zero according to the backlight change trend.

In some examples, the second adjustment module is configured to: if the difference value at the backlight change position is a negative number and the difference value at the adjacent position of the backlight change position is zero, adjust the backlight value at the backlight change position to zero.

In some examples, the backlight adjustment device further includes a fourth acquisition module. The fourth acquisition module is configured to acquire the backlight matrix according to the display gray value of the image.

In some examples, the fourth acquisition module is configured to: acquire a maximum display gray value and an average display gray value of each image subregion according to the display gray values of the plurality of pixel points of each image subregion; and weight the maximum display gray value and the average gray value of each image subregion to obtain the backlight value of the backlight subregion corresponding to the image subregion.

An embodiment of the present disclosure further provides a computer system. The computer system includes a memory, a processor and a computer program stored on the memory, and the processor executes the computer program to realize the steps of the backlight adjustment method in any of the above embodiments.

An embodiment of the present disclosure further provides a computer-readable storage medium, on which a computer program is stored. When executed by a processor, the computer program realizes the steps of the backlight adjustment method of any of the above embodiments.

An embodiment of the present disclosure further provides a computer program product, including a computer program. The computer program, when executed by a processor, realizes the steps of the backlight adjustment method of any of the above embodiments.

It should be understood by those skilled in the art that the embodiments of the present disclosure can be provided as methods, systems, or computer program products. Therefore, the present disclosure can take the form of an entirely hardware embodiment, an entirely software embodiment, or an embodiment combining software and hardware aspects. Furthermore, the present disclosure can take the form of a computer program product implemented on one or more computer-usable storage mediums (including but not limited to disk storage, CD-ROM, optical storage, etc.) containing computer-usable program codes therein.

The present disclosure is described with reference to flowcharts and/or block diagrams of methods, devices (systems) and computer program products according to embodiments of the present disclosure. It should be understood that each flow and/or block in the flowchart and/or block diagram, and combinations of the flow and/or block in the flowchart and/or block diagram can be implemented by computer program instructions. These computer program instructions may be provided to a processor of a general-purpose computer, a special-purpose computer, an embedded processor or other programmable data processing apparatus to produce a machine, such that the instructions executed by the processor of the computer or other programmable data processing apparatus produce means for implementing the functions specified in flow or flows of the flow chart and/or block or blocks of the block diagram.

These computer program instructions may also be stored in a computer-readable memory that can direct a computer or other programmable data processing apparatus to work in a particular manner, such that the instructions stored in the computer-readable memory produce an article of manufacture including instruction means, and the instruction means implements the functions specified in flow or flows of the flow chart and/or block or blocks of the block diagram.

These computer program instructions may also be loaded onto a computer or other programmable data processing apparatus, such that a series of operational steps are performed on the computer or other programmable apparatus to produce a computer-implemented process, such that the instructions executed on the computer or other programmable apparatus provide steps for implementing the functions specified in flow or flows of the flow chart and/or block or blocks of the block diagram.

It can be understood by those skilled in the art that in the above-mentioned method of specific embodiments, the writing order of various steps does not mean strict execution order or constitute any limitation on the implementation process, and the specific execution order of these steps should be determined according to their functions and possible internal logics.

The following points need to be explained:

(1) In the drawings of the embodiments of the present disclosure, only the structures related to the embodiments of the present disclosure are involved, and other structures can refer to general designs.

(2) Features in the same embodiment and different embodiments of the present disclosure can be combined with each other in case of no conflict.

The above are merely the specific embodiments of the present disclosure, but the scope of protection of the present disclosure is not limited to this. Any person familiar with the technical field can easily conceive of changes or substitutions within the technical scope disclosed in the present disclosure, which all should be included in the scope of protection of the present disclosure. Therefore, the scope of protection of the present disclosure should be based on the scope of protection of the appended claims.

The invention claimed is:

1. A backlight adjustment method for a display device, comprising:

inputting a plurality of frames of images to the display device;

acquiring a backlight matrix corresponding to each of the plurality of frames of images, wherein the backlight matrix comprises a plurality of backlight values;

acquiring a connected domain consisting of the backlight value which is a positive number, according to the backlight matrix; and determining an adjustment scheme of the backlight value at a boundary position of the connected domain according to the connected domain, wherein the connected domain consisting of a plurality of backlight values which are positive numbers.

2. The backlight adjustment method according to claim 1, wherein the determining the adjustment scheme of the backlight value at the boundary position of the connected domain according to the connected domain, comprises:

acquiring a first parameter according to the connected domain;

setting a first parameter threshold, and comparing the first parameter with the first parameter threshold;

when the first parameter is smaller than or equal to the first parameter threshold, adjusting the backlight value at the boundary position of the connected domain by adopting a first adjustment scheme;

when the first parameter is greater than the first parameter threshold, adjusting the backlight value at the boundary position of the connected domain by adopting the first adjustment scheme or a second adjustment scheme, wherein the first adjustment scheme and the second adjustment scheme are different.

3. The backlight adjustment method according to claim 2, wherein the first parameter comprises: a ratio of a perimeter of the connected domain to a perimeter of a backlight region; or a ratio of an area of the connected domain to an area of the backlight region.

4. The backlight adjustment method according to claim 2, wherein after determining that the first parameter is greater than the first parameter threshold, the determining the adjustment scheme of the backlight value at the boundary position of the connected domain according to the connected domain further comprises:

acquiring a second parameter according to the connected domain;

setting a second parameter threshold, and comparing the second parameter with the second parameter threshold;

when the second parameter is smaller than or equal to the second parameter threshold, adjusting the backlight value at the boundary position of the connected domain by adopting the second adjustment scheme;

when the second parameter is greater than second parameter threshold, determining whether to adopt the first adjustment scheme according to a third parameter.

5. The backlight adjustment method according to claim 4, wherein the second parameter comprises a ratio of a maximum boundary distance of the connected domain to a minimum boundary distance of the connected domain.

6. The backlight adjustment method according to claim 4, wherein after determining that the second parameter is greater than the second parameter threshold, the determining the adjustment scheme of the backlight value at the boundary position of the connected domain according to the connected domain further comprises:

acquiring the third parameter according to the connected domain;

setting a third parameter threshold, and comparing the third parameter with the third parameter threshold;

when the third parameter is smaller than or equal to the third parameter threshold, adjusting the backlight value at the boundary position of the connected domain by adopting the first adjustment scheme;

when the third parameter is greater than the third parameter threshold, adjusting the backlight value at the boundary position of the connected domain by adopting the second adjustment scheme.

7. The backlight adjustment method according to claim 6, wherein the third parameter comprises a ratio of a minimum boundary distance of the connected domain to a minimum boundary distance of the backlight region.

8. The backlight adjustment method according to claim 4, wherein:

the first adjustment scheme comprises:

multiplying the backlight value at the boundary position of the connected domain by a weighting coefficient;

the second adjustment scheme comprises:

filtering the backlight value at the boundary position of the connected domain.

9. The backlight adjustment method according to claim 8, wherein before filtering the backlight value at the boundary position of the connected domain, the second adjustment scheme further comprises:

judging a number and a position of an adjacent position, where the backlight value is zero, of the boundary position of the connected domain; and selecting a filtering operator according to the judging result.

10. The backlight adjustment method according to claim 9, wherein the backlight matrix comprises a row direction and a column direction, and the number of adjacent positions of the boundary position of the connected domain is four, and the four adjacent positions comprise: a first adjacent position and a second adjacent position which are opposite to each other in the row direction, and a third adjacent position and a fourth adjacent position which are opposite to each other in the column direction, with the boundary position as a center;

the selecting the filtering operator according to the judging result comprises:

when the backlight value at one of the first adjacent position and the second adjacent position is zero and the backlight value at one of the third adjacent position and the fourth adjacent position is zero, selecting an N*N type filtering operator or a "cross" type filtering operator;

when the backlight value at one of the first adjacent position and the second adjacent position is zero, selecting a 1*N type filtering operator; and when the backlight value at one of the third adjacent position and the fourth adjacent position is zero, selecting an N*1 filtering operator, where N is an odd number greater than or equal to 3.

11. The backlight adjustment method according to claim 1, wherein the acquiring a backlight matrix corresponding to each of the plurality of frames of images comprises:

acquiring backlight matrices corresponding to any two adjacent frames of images, wherein the backlight adjustment method further comprises:

acquiring a backlight difference matrix according to the backlight matrices of the any two adjacent frames of images;

determining a backlight change position according to the backlight difference matrix; and judging a backlight change trend of the backlight change position according to the backlight difference matrix.

12. The backlight adjustment method according to claim 11, wherein a difference value in the backlight difference matrix comprises zero, a positive number or a negative number, wherein the determining the backlight change position according to the backlight difference matrix comprises:

when the difference value in the backlight difference matrix is a positive number or a negative number, it is determined that a position where the difference value is located is the backlight change position.

13. The backlight adjustment method according to claim 12, wherein the judging the backlight change trend of the backlight change position according to the backlight difference matrix comprises:

determining the backlight change position where the difference value is a positive number according to the backlight difference matrix;

judging whether the difference value, at an adjacent position of the backlight change position where the difference value is the positive number, is zero; and judging the backlight change trend of the backlight change position according to a judging result.

14. The backlight adjustment method according to claim 13, wherein the adjacent position of the backlight change position comprises a first position, a second position, a third position and a fourth position which are arranged clockwise around the backlight change position as a center, wherein the judging the backlight change trend of the backlight change position according to the judging result comprises:

when the difference value at only one of the first position, the second position, the third position and the fourth position is zero, the backlight change trend of the backlight change position is towards the position where the difference value is zero;

when the difference values at any two adjacent positions of the first position, the second position, the third position and the fourth position are zero, the backlight change trend of the backlight change position is towards a gap between the two adjacent positions; and when the difference values at any three of the first position, the second position, the third position and the fourth position are zero, the backlight change trend of the backlight change position is towards a direction away from one position where the difference value is not zero among the first position, the second position, the third position and the fourth position.

15. The backlight adjustment method according to claim 12, further comprising:

adjusting the backlight value at the backlight change position to zero according to the backlight change trend.

16. The backlight adjustment method according to claim 15, wherein the adjusting the backlight value at the backlight change position to zero according to the backlight change trend comprises:

when the difference value at the backlight change position is a negative number and the difference value at the adjacent position of the backlight change position is zero, adjusting the backlight value at the backlight change position to zero.

17. The backlight adjustment method according to claim 11, further comprising:

adjusting the backlight value at the adjacent position of the backlight change position according to the backlight change trend, wherein the difference value at the adjacent position of the backlight change position is zero.

18. The backlight adjustment method according to claim 17, wherein the adjusting the backlight value at the adjacent position of the backlight change position according to the backlight change trend comprises:

determining the backlight change position where the difference value is a positive number;

determining a fifth position adjacent to the backlight change position where the difference value is the positive number and a sixth position adjacent to the fifth position along the backlight change trend; and adjusting the backlight value at the fifth position.

19. A computer system, comprising a memory, a processor and a computer program stored on the memory, wherein the processor is configured to execute the computer program to realize a backlight adjustment method, wherein the backlight adjustment method for a display device comprises:

the inputting a plurality of frames of images to the display device;

acquiring a backlight matrix corresponding to each of the plurality of frames of images, wherein the backlight matrix comprises a plurality of backlight values;

acquiring a connected domain consisting of the backlight value which is a positive number, according to the backlight matrix; and determining an adjustment scheme of the backlight value at a boundary position of the connected domain according to the connected domain, wherein the connected domain consisting of a plurality of backlight values which are positive numbers.

20. A non-transitory computer-readable storage medium having a computer program stored thereon, wherein the computer program, when executed by a processor, is configured to realize steps of a backlight adjustment method wherein the backlight adjustment method for a display device comprises:

acquiring a backlight matrix corresponding to each of the plurality of frames of images, wherein the backlight matrix comprises a plurality of backlight values;

acquiring a connected domain consisting of the backlight value which is a positive number, according to the backlight matrix; and determining an adjustment scheme of the backlight value at a boundary position of the connected domain according to the connected domain, wherein the connected domain consisting of a plurality of backlight values which are positive numbers.

* * * * *